US011407596B1

(12) United States Patent
Nitzberg et al.

(10) Patent No.: US 11,407,596 B1
(45) Date of Patent: Aug. 9, 2022

(54) METHODS AND SYSTEMS FOR ESTABLISHING AND TRANSMITTING STATUS PARAMETERS OF A CONVEYOR TECHNOLOGICAL FIELD

(71) Applicant: INTELLIGRATED HEADQUARTERS, LLC, Mason, OH (US)

(72) Inventors: Jason-David Nitzberg, Batavia, OH (US); Timothy R. Williams, Middletown, OH (US); Rickey L. Busick, Lebanon, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 17/162,613

(22) Filed: Jan. 29, 2021

(51) Int. Cl.
*B65G 47/42* (2006.01)
*B65G 47/26* (2006.01)

(52) U.S. Cl.
CPC .......... *B65G 47/42* (2013.01); *B65G 47/268* (2013.01); *B65G 2203/0233* (2013.01); *B65G 2203/041* (2013.01); *B65G 2203/045* (2013.01)

(58) Field of Classification Search
None
See application file for complete search history.

(56) References Cited

U.S. PATENT DOCUMENTS

| | | | |
|---|---|---|---|
| 5,060,785 A | 10/1991 | Garrity | |
| 5,191,967 A | 3/1993 | Woltjer et al. | |
| 5,358,097 A | 10/1994 | Bakkila et al. | |
| 5,429,225 A | 7/1995 | Schiesser et al. | |
| 5,540,323 A | 7/1996 | Schiesser et al. | |
| 5,862,907 A | 1/1999 | Taylor | |
| 6,315,104 B1 | 11/2001 | Ebert | |
| 6,811,018 B2 | 11/2004 | Cotter et al. | |
| 6,889,822 B1 | 5/2005 | Wagner et al. | |
| 7,364,035 B2 | 4/2008 | German et al. | |
| 8,060,245 B2 | 11/2011 | Lupton et al. | |
| 8,284,993 B2 | 10/2012 | Taylor et al. | |
| 8,763,788 B2 | 7/2014 | Neiser | |
| 8,886,356 B2 | 11/2014 | Magato et al. | |
| 9,321,598 B2 | 4/2016 | Araki et al. | |
| 9,446,908 B2 * | 9/2016 | Danelski | G05B 19/124 |
| 10,341,135 B2 * | 7/2019 | Kacel | H04L 12/40 |
| 10,577,191 B2 | 3/2020 | Anderson et al. | |
| 10,654,659 B2 | 5/2020 | Combs et al. | |
| 11,059,676 B2 * | 7/2021 | Nitzberg | B65G 47/261 |
| 2003/0192769 A1 | 10/2003 | Cotter et al. | |
| 2004/0112713 A1 | 6/2004 | Haan et al. | |
| 2020/0247616 A1 | 8/2020 | Nitzberg | |

* cited by examiner

*Primary Examiner* — William R Harp
(74) *Attorney, Agent, or Firm* — Alston & Bird LLP

(57) ABSTRACT

A method for establishing and transmitting the status parameters of a conveyor and it's articles accumulated includes recording a first signal and a second signal with the first signal received from at least one sensor of a plurality of sensors in a conveyor zone and the second signal transmitted in response to receiving the first signal. The first signal is indicative of an article presence status in the conveyor zone and the second signal is indicative of an actuation status of the conveyor zone. Further, the method includes storing the first signal and the second signal recorded over a periodic scan cycle in a memory to create a historical log of the first signal and the second signal.

20 Claims, 4 Drawing Sheets

METHODS AND SYSTEMS FOR ESTABLISHING AND TRANSMITTING STATUS PARAMETERS OF A CONVEYOR

TECHNOLOGICAL FIELD

Example embodiments of the present invention relate generally to a material handling system for handling articles, and, more particularly, controlling accumulation and release of articles on conveyors by establishing and transmitting status parameters of conveyors in a material handling system.

BACKGROUND

Conventionally, in material handling environments, multiple conveyors can be arranged for transporting articles from one place to another. These articles may be consumer goods, packaged boxes, cases, items, cartons, and/or the like that are to be transported on such conveyors from a source location to a destination location. Conveyors used for transporting articles generally include a pick area, transport conveyors, a merge subsystem, and a sortation conveyor that sorts articles onto a plurality of takeaway conveyors that subsequently transport the articles to their intended destination. Before the articles are transported to their intended destinations, the articles can be transported to an area of a warehouse facility where multiple lines of upstream conveyors merge on a downstream conveyor. Often, articles can be accumulated in the multiple lines of upstream conveyors before the articles are merged on to the downstream conveyor. Once the articles are merged, the articles can be transported to sortation conveyors where the articles are sorted as per their intended destination.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a method for article release management which includes recording a first signal and a second signal with the first signal received from at least one sensor of a plurality of sensors in a conveyor zone and the second signal transmitted in response to receiving the first signal. The first signal is indicative of an article presence status in the conveyor zone and the second signal is indicative of an actuation status of the conveyor zone. Further, the method includes storing the first signal and the second signal recorded over a periodic scan cycle in a memory to create a historical log of the first signal and the second signal. Further, the method includes calculating an accumulation parameter using the historical log of the first signal and the second signal and communicating the accumulation parameter from a first controller to a second controller to enable the second controller to determine if a release of an article from the conveyor zone is to be initiated.

Various example embodiments described herein relate to a method for article release management which includes updating the first signal and the second signal over the periodic scan cycle and storing the first signal and the second signal in look-up tables or tracking arrays assigned for each conveyor zone.

Various example embodiments described herein relate to a method for article release management which includes calculating a total length of articles ready to be released from conveyor zones of an upstream conveyor zone to a downstream conveyor, a total length of the articles accumulated in each conveyor zone on the upstream conveyor, a total length of conveyor with moving articles in each conveyor zone on the upstream conveyor, and a length of an article fed onto the upstream conveyor.

Various example embodiments described herein relate to a method for article release management which includes calculating an estimated article infeed rate, a percentage of article accumulated, a first full percentage of the upstream conveyor, a second full percentage of the upstream conveyor, a total length of the articles currently on the upstream conveyor, a total length of articles currently moving and an average article length.

Various example embodiments described herein relate to a method for article release management which includes calculating an estimated discharge rate percent, estimated compaction quality of the release, estimated quantity of the articles on the upstream conveyor, estimated article length being discharged, and article gap being discharged.

Various example embodiments described herein relate to a method for article release management which includes recording the first signal received and the second signal transmitted from/to multiple conveyor zones on the upstream conveyor and storing the first signal received and the second signal transmitted in the look-up tables or tracking arrays assigned for each conveyor zone and further updating the look-up tables over the periodic scan cycle to create the historical log for each conveyor zone on the upstream conveyor.

Various example embodiments described herein relate to a method for article release management which includes receiving the first signal at the first controller from the at least one sensor in the conveyor zone and determining if the second signal is to be transmitted from the first controller to a zone control module to toggle the upstream conveyor between one of an accumulated state and a non-accumulated state.

Various example embodiments described herein relate to a method for article release management, wherein the periodic scan cycle defines a first specified time interval at which the first controller is an active state, and wherein a cumulative value of the first signal and the second signal is recorded during the periodic scan cycle creating the historical log of the first signal and the second signal.

Various example embodiments described herein relate to a method for article release management, wherein the article presence status is indicative of a presence of one or more articles which is based on blocked/unblocked status of the at least one sensor in each conveyor zone during the periodic scan cycle.

Various example embodiments described herein relate to a method for article release management, wherein the actuation status is indicative of the ON/OFF status of a conveyor zone during the periodic scan cycle.

Various example embodiments described herein relate to a method for article release management, wherein the ON/OFF status is indicative of whether the conveyor zone is in one of the accumulated state or the non-accumulated state.

Various example embodiments described herein relate to a controller which includes a processor and a memory. The processor is coupled to the memory and is configured to record a first signal received from at least one sensor of a plurality of sensors in a conveyor zone and a second signal transmitted in response to the first signal. Further, the controller is configured to store the first signal and the second signal over a periodic scan cycle in the memory to create a historical log of the first signal and the second signal, wherein the first signal is indicative of article presence status in the conveyor zone and the second signal is indicative of an actuation status of the conveyor zone. Further, the controller is configured to calculate an accumulation parameter using the historical log of the first signal and the second signal; and communicate the accumulation parameter to enable another controller determine if a release of an article from the conveyor zone is to be initiated.

Various example embodiments described herein relate to controller which includes a processor and a memory, wherein the at least one sensor is one of a photo-eye sensor, an infrared sensor, a laser sensor, a proximity sensor, or an image sensor.

Various example embodiments described herein relate to controller which includes a processor and a memory, wherein the processor is configured to calculate a total length of articles ready to be released from conveyor zones of an upstream conveyor zone to a downstream conveyor, a total length of the articles accumulated in each conveyor zone on the upstream conveyor, a total length of conveyor with moving articles in each conveyor zone on the upstream conveyor, and a length of an article fed onto the upstream conveyor.

Various example embodiments described herein relate to controller which includes a processor and a memory, wherein the processor is configured to calculate an estimated article infeed rate, a percentage of article accumulated, a first full percentage of the upstream conveyor, a second full percentage of the upstream conveyor, a total length of the articles currently on the upstream conveyor, a total length of articles currently moving and an average article length.

Various example embodiments described herein relate to a controller which includes a processor and a memory, wherein the processor is configured to calculate an estimated discharge rate percent, estimated compaction quality of the release, estimated quantity of the articles on the upstream conveyor, estimated article length being discharged, and a gap between the articles being discharged.

Various example embodiments described herein relate to a material handling system with an upstream conveyor communicably coupled to a first controller and a downstream conveyor communicably coupled to a second controller. The first controller and the second controller communicably coupled to each other and with at least one sensor installed on the upstream conveyor and the downstream conveyor. The first controller is configured to record a first signal received from the at least one sensor of the upstream conveyor and a second signal transmitted in response to the first signal. The first controller is further configured to store the first signal and the second signal over multiple scan cycles in the memory to create a historical log of the first signal and the second signal, wherein the first signal is indicative of article presence status in the upstream conveyor and the second signal is indicative of an actuation status of the upstream conveyor. Further, the first controller is further configured to calculate an accumulation parameter using the historical log of the first signal and the second signal; and communicate the accumulation parameter to enable the second controller to determine if a release of an article from the upstream conveyor is to be initiated.

Various example embodiments described herein relate to a material handling system with the first controller further configured to: calculate a total length of articles ready to be released from conveyor zones of an upstream conveyor zone to a downstream conveyor; a total length of the articles accumulated in each conveyor zone on the upstream conveyor; a total length of conveyor with moving articles in each conveyor zone on the upstream conveyor; and a length of an article fed onto the upstream conveyor.

Various example embodiments described herein relate to a material handling system with the first controller further configured to: calculate an estimated article infeed rate, a percentage of article accumulated, a first full percentage of the upstream conveyor, a second full percentage of the upstream conveyor, a total length of the articles currently on the upstream conveyor, total length of articles currently moving and an average article length.

Various example embodiments described herein relate to a material handling system with the first controller further configured to: calculate an estimated discharge rate percent, estimated compaction quality of the release, estimated quantity of the articles on the upstream conveyor, estimated article length being discharged, and a gap between the articles being discharged.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
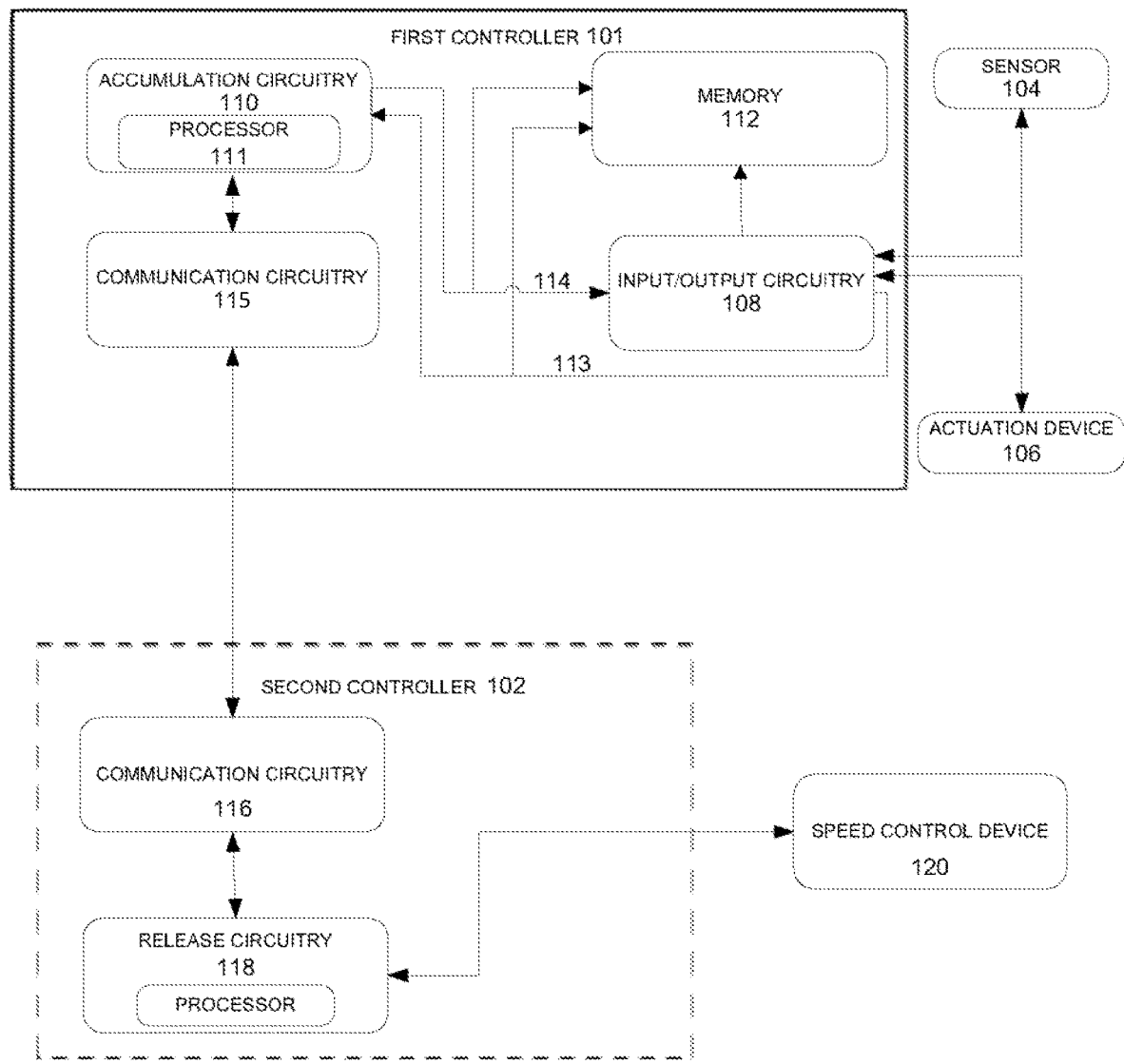
FIG. 1 illustrates a schematic block diagram of a material handling system in accordance with an embodiment of the present invention.

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein;

rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details.

The term "processor" is used herein to refer to devices which can be configured to perform the various functionality set forth in this disclosure, either individually or in combination with other devices. Examples of processors may include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The term "processing system" may be used to refer to one or more processors, which may be included in a single device, or distributed among multiple physical devices.

According to the present subject matter, the term "module" or "component" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by the processor; other suitable hardware components that provide the described functionality; or a combination of some or all of the above, such as in a system-on-chip.

As used herein, the terms "upstream conveyors," refer to accumulation conveyors in accordance with embodiments of the present disclosure.

As used herein, the terms "downstream conveyor," "take-away conveyor", and similar terms may be used interchangeably to refer to merger conveyors in accordance with embodiments of the present disclosure.

As used herein, the terms "accumulation conveyor" and "accumulating conveyor" refer to any conveyor, carousel, assembly line, production line, conveyor belt, and/or any other form of object utilized for moving, transporting, and accumulating product, components, materials, articles, or items and is suitable for use or operation in a product handling environment.

As used herein, the terms "downstream direction" or "downstream" is the direction articles travel on an accumulation conveyor, and "upstream direction" or "upstream" is the direction opposite of the direction articles travel on an accumulation conveyor. A "downstream zone" is a zone which is disposed in the downstream direction from another zone.

The term "slug" is used herein to refer to more than one article accumulated at an upstream conveyor with no gap or minimal gap between each article ready to be released on to the downstream conveyor.

For the purposes of this specification, it will be understood that a "conveyor" may refer to a device for conveying a plurality of articles in a conveyed direction in one or more paths/lanes, or one or more of the individual paths/lanes along which multiple articles are driven, irrespective of how many separate drive mechanisms are used to convey the articles along those paths/lanes. In some embodiments, a plurality of conveying lanes paths may be parallel, although in some embodiments, the lanes may not be parallel.

It will also be understood that various embodiments of the methods and conveying systems disclosed herein are not limited to conveying systems that transport articles of any size or shape. While the accompanying drawings depict articles that are only square or rectangular, this is only for purposes of illustration, and it will be understood that the conveying systems and methods disclosed herein are equally applicable for transporting articles having different shapes and sizes. It will also be understood that the conveyor systems and methods disclosed herein are applicable to a variety of different conveyor types, such as belt conveyors, roller conveyors, and the like.

Further, the term "article" may indicate an object, thing, item, unit, piece of merchandise, commodity, product, good, or an entity synonymous with the definition provided.

Further, the various principles disclosed herein may be applied to multiple feed conveyors that may be controlled in accordance with the principles disclosed herein. Also, the various principles disclosed herein may also be applied to only a single feed conveyor, if desired, thereby enabling the principles to be applied to a wide variety of different conveying system layouts and facilities having a single feed conveyor and/or multiple feed conveyors.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of. Furthermore, to the extent that the terms "includes" and "including" and variants thereof are used in either the detailed description or the claims, these terms are intended to be inclusive in a manner similar to the term "comprising."

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

Moreover, the word "exemplary" is used herein to mean "serving as an example, instance, or illustration." Any implementation, aspect, or design described herein as "exemplary" is not necessarily to be construed as preferred or advantageous over other implementations, aspects, or designs. Rather, use of the word exemplary is intended to present concepts in a concrete fashion.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As used in this application, the terms "component", "controller", "system", "circuitry" and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The component may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated as software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multi-thread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "memory", "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such component are intended to correspond, unless otherwise indicated, to any component which performs the specified function of the described component (e.g., a functional equivalent), even though not structurally equivalent to the disclosed structure, which performs the function in the herein illustrated example aspect of the embodiments. In this regard, it will also be recognized that the embodiments comprise a system as well as a computer-readable medium having computer-executable instruction for performing the acts and/or events of the various methods.

Computing devices typically comprise a variety of media, which can comprise "computer-readable storage media" and/or "communications media," which two terms are used herein differently from one another as follows. "Computer-readable storage media" can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tapes, magnetic disk storage or other magnetic storage devices, or other tangible and/or non-transitory media which can be accessed by one or more local or remote computing devices, e.g., via access requests, queries or other data retrieval protocols, for a variety of operations with respect to the information stored by the medium.

Methods, apparatuses, systems, and computer program products of the present invention may be embodied by any of a variety of devices. For example, the method, apparatus, system, and computer program product of an example embodiment may be embodied by a networked device, such as a server or other network entity, configured to communicate with one or more devices, such as the one or more sensors or the one or more zone control modules associated with an accumulation conveyor. Additionally, or alternatively, the computing device or controller may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices. Still further, example embodiments may be embodied by devices utilizing IoT (Internet of Things) or IIoT (Industrial Internet of Things) technology. In still further embodiments, the method, apparatus, system, and computer program product of an example embodiment may be embodied in, have access to, or otherwise be associated with a gateway device or cloud-based platform.

Generally, articles are accumulated on conveyors before merging the articles and sorting the article to their intended destination. Merger conveyor may be used upstream of sortation conveyor and multiple feed conveyors may be used upstream of the merge conveyor. The multiple feed conveyors positioned upstream of the merge conveyors may be accumulation conveyors. Often, the articles are released from these accumulation conveyors based on an accumulation control logic in which one or more photoeyes and a timer/counter circuit may be employed as I/O devices. The one or more photoeyes may be positioned alongside conveyor zones of the accumulation conveyors. The timer/counter circuit may be associated with each of the multiple accumulation conveyors. When the photoeyes sense the presence of an article for more than a predefined time-period set in the timer/counter circuit, this is indicative of accumulation of articles on a conveyor zone of an accumulation conveyor. The presence of an article is indicated when the article blocks a light emitted from the photoeyes. A time-duration of blockage of the light is compared to the predefined time-period set in the timer/counter circuit to release the articles from the conveyor zone of the accumulation conveyor. In this regard, if multiple photoeyes are positioned at different locations along the accumulation conveyor at different conveyor zones, an upstream-most photoeye that detects the presence of an article for a time-duration equal or greater than the predefined time-period set in the timer/counter circuit will be indicative of the release of the articles accumulated on the different conveyor zones of the accumulation conveyor. Therefore, the release of the articles, from the accumulation conveyor to the merge conveyor, will be initiated once the predefined time-period criteria is satisfied. In such scenarios, when an article of a larger dimension, for example, an article of a longer length is introduced in a conveyor zone of the accumulation conveyor to travel past the upstream-most photoeye, then the time-duration of blockage of the light from the photoeye may be longer and may be equal to the length of longer article. In this regard, the photoeye continues to remain in a blocked state though the longer article is in motion and is not stopped/accumulated. Therefore, there is a possibility that the timer/counter circuit will trigger though the conveyor zone is not accumulating since the time-duration of blockage will be equal or greater than the predefined time-period set in the timer/counter circuit.

Further, when the articles are released from the accumulation conveyor, the release of the articles continues to occur for a preset time interval regardless of number of articles accumulated on the accumulation conveyor. A discharge conveyor zone at a downstream end of the accumulation conveyor stops the release of the articles only when the preset time interval elapses. In this regard, if all the articles accumulated in the accumulation conveyor is discharged to the merge conveyor before the preset time interval, then the discharge zone may not stop operating until the preset time interval elapses. In such scenario, only air is discharged to the merge conveyor until the preset time interval elapses because all the articles have already been discharged before the preset time interval. In this regard, there is possibility of delay in merging time and accumulation time since the discharge zone continues to operate and release air until the preset time interval elapses leading to hindrance in the throughput of both the accumulation conveyor and the merge conveyor. Therefore, there exists a need to reduce the preset time interval and halt the operation of the discharge zone when it starts the release of air and stops the release of articles such that the merging time and the accumulation time are greatly reduced, thereby increasing a throughput of the accumulation conveyor.

Through applied effort, ingenuity, and innovation, many of the above identified problems have been solved by developing solutions that are included in embodiments of the present disclosure, many examples of which are described in detail herein. The present disclosure relates to an accumulation logic executed by a controller. The controller records a first signal received from at least one sensor of a plurality of sensors in a conveyor zone and a second signal transmitted in response to receiving the first signal. Further, the first signal and the second signal recorded over a periodic scan cycle is stored in a memory to create a historical log of the first signal and the second signal, wherein the first signal is indicative of an article presence status in the conveyor zone and the second signal is indicative of an actuation status of the conveyor zone. The controller calculates an accumulation parameter using the historical log of the first signal and the second signal and communicates the accumulation parameter to determine if a release of an article from the conveyor zone of the accumulation conveyor is to be initiated.

According to an embodiment, the controller calculates one or more accumulation parameters which comprises a total length of articles ready to be released from conveyor zones of an upstream conveyor zone to a downstream conveyor, a total length of the articles accumulated in each conveyor zone on the upstream conveyor, a total length of conveyor with moving articles in each conveyor zone on the upstream conveyor, and a length of an article fed onto the upstream conveyor.

According to an embodiment, the controller calculates the one or more accumulation parameters which comprises an estimated article infeed rate, a percentage of article accumulated, a first full percentage of the upstream conveyor, a second full percentage of die upstream conveyor, a total length of the articles currently on the upstream conveyor, total length of articles currently moving and an average article length.

According to an embodiment, the controller calculates the one or more accumulation parameters which comprises an estimated discharge rate percent, estimated compaction quality of release, estimated quantity of the articles on the upstream conveyor, estimated article length being discharged, and article gap being discharged.

In the following detailed description of exemplary embodiments of the disclosure, specific representative embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

Throughout this specification, the term 'conveyor' or 'conveyor system' may be used interchangeably and term 'conveyor' may be taken as an example of either a roller conveyor or a belt conveyor.

Throughout this specification, the term 'scan cycle of operation' or 'scan cycle' or 'scan count' or 'periodic scan cycle' may be used interchangeably to define an active state of the controller, which occurs at periodic time intervals.

Figure 2:
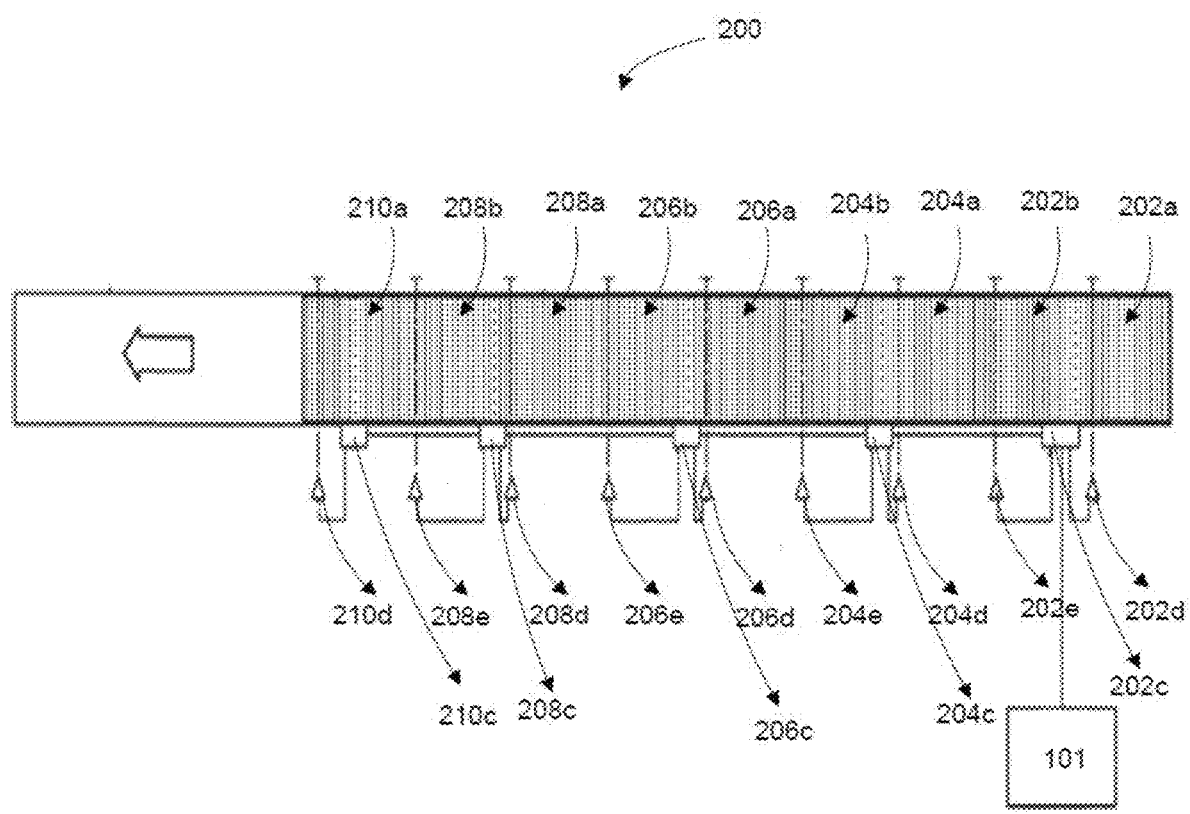
FIG. 2 illustrates an example zone-based accumulation conveyor in accordance with various aspects and embodiments of the present invention.
Figure 3:
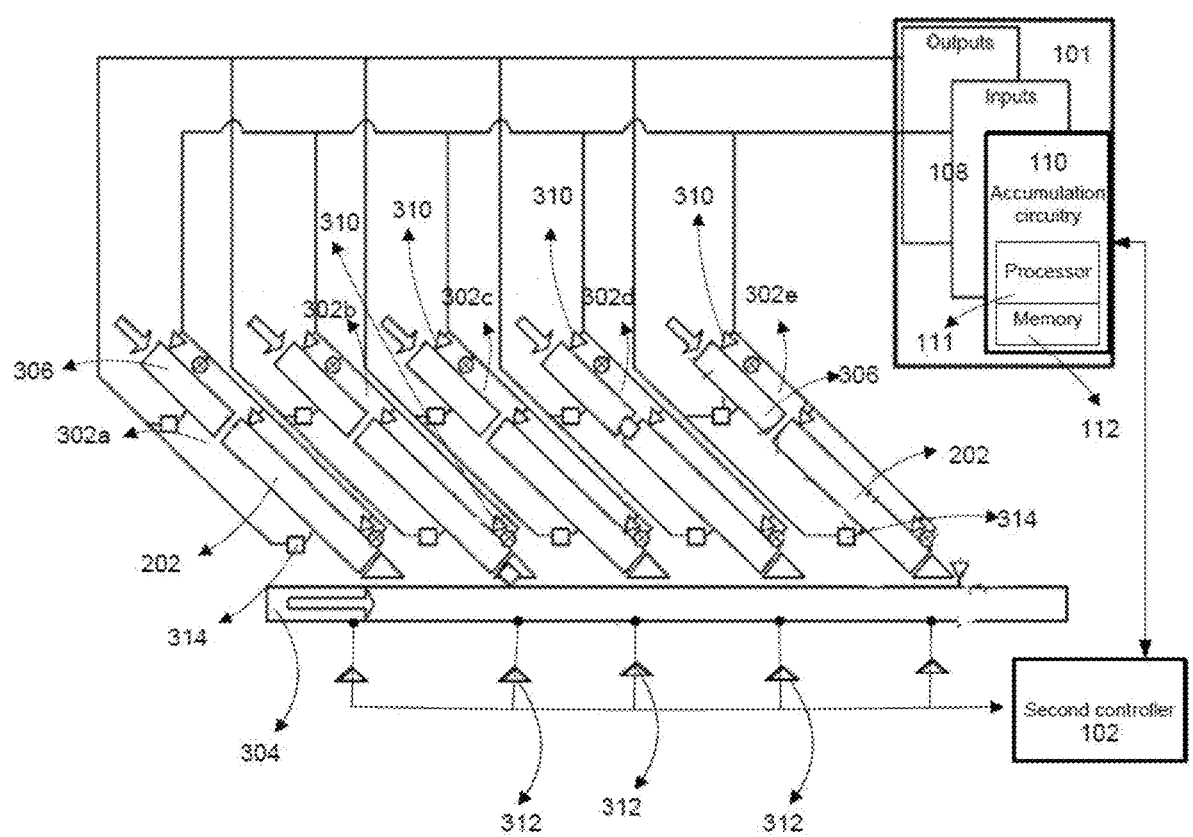
FIG. 3 illustrates a diagrammatic plan view of multiple lines of feed conveyors and a takeaway conveyor in accordance with an embodiment of the present invention.

Referring now specifically to the drawings and the illustrative embodiments depicted therein, FIG. 1 illustrates a schematic block diagram of material handling system in accordance with an embodiment of the present invention. The material handling system may include multiple conveyors configured to transport articles from a source location to a destination location in a material handling environment such as a warehouse or a distribution center. For example, the multiple conveyors may include multiple upstream conveyors and downstream conveyors. In some examples, the multiple upstream conveyors are accumulation conveyor and the downstream conveyors may be merge conveyors. As illustrated in the example embodiment of FIG. 1, a first controller 101 and a second controller 102 of two conveyors communicably coupled with each other are disclosed. The first controller 101 may control an operation of an accumulation conveyor and the second controller 102 may control on operation of a merge conveyor. According to an embodiment, the first controller 101 and the second controller 102 may be a sub-system of a central controller. According to another embodiment, the first controller 101 may directly control the operations of a plurality of accumulation conveyors. According to yet another embodiment, the first controller 101 may be a central controller communicably coupled to multiple local controllers on the accumulation conveyors. Throughout the description, the first controller 101 without limitation is referred to as a controller which is dedicated for processing and controlling the operations of any accumulation conveyor, which includes one or more conveyor zones as shown in FIG. 2 and FIG. 3. As illustrated in the example embodiment of FIG. 1, a first controller 101 includes one or more components, such as, but not limited to, an accumulation circuitry 110, input/output circuitry 108, a communication circuitry 115 and a memory 112.

According to an embodiment, the accumulation conveyor may include individually controllable zones as shown in FIG. 2 that may be controlled in a manner which efficiently accumulates articles. To control the accumulation conveyor, the first controller 101 is in communication with a sensor 104 and an actuation device 106. The sensor 104, for example, may be a photoeye sensor 104. In some examples, the sensor 104 may be any sensor 104 capable of detecting the presence of articles and/or gaps on the accumulation conveyor. The actuation device 106, for example, may be an accumulator assembly which actuates a drive belt to engage or disengage rollers of the accumulation conveyor to operate the conveyor in one of an accumulating state and a non-accumulating state. For example, when the accumulator assembly is in the non-actuated position, the articles on the accumulation conveyor begins accumulation and when the accumulator assembly is in the actuated position, the articles on the accumulation conveyor stops accumulating as the rollers of the accumulation conveyor are driven by the drive belt at the actuated position. An example of such actuation device 106 is explained in detail in U.S. Pat. No. 6,889,822 and U.S. Pub. No. 20060076216, incorporated herein for reference.

According to an embodiment, the sensor 104 and the actuation device 106 is communicably connected to the input/output circuitry 108 which in turn is connected to the accumulation circuitry 110, wherein the input/output circuitry 108 transmit/receive one or more signals to/from the sensor 104 and the actuation device 106. According to an embodiment, the input/output circuitry 108 receives the one or more signals from the accumulation circuitry 110 to control an operating state of the actuation device 106. As discussed previously, the actuation device 106 can toggle between two operating states (i.e.) the actuation position and non-actuated position for changing a state of the accumulation conveyor between the accumulating state and the non-accumulating state. Further, the input/output circuitry 108 receives the one or more signals from the sensor 104 and the actuation device 106 which may be provided as feedback to the accumulation circuitry 110 to indicate the operating state of the sensor 104 and the actuation device 106. The operating state of the sensor 104 may be an indication whether the sensor 104 is blocked, unblocked or non-functional. The operating state of the actuation device 106 may be an indication whether the actuation device 106 is in the actuation position or the non-actuated position. In FIG. 1, an example of one sensor 104 from one of the conveyor zones of a plurality of conveyor zones is shown, however, it is understood that the input/output circuitry 108 can process the one or more signals from multiple sensor 104s positioned at multiple locations on the plurality of conveyor zones. In this regard, the sensor 104 of FIG. 1 may be considered as a non-limiting example of a sensor 104 monitoring at least one conveyor zone. Similarly, the actuation device 106 may be considered as a non-limiting example of an actuation device 106 actuating at least one conveyor zone. Such operating states of both the sensor 104 and the actuation device 106 over a specified time interval is recorded in a memory 112 in the form of one or more signals.

According to an embodiment, the one or more signals may include a first signal 113 and a second signal 114, wherein the first signal 113 is indicative of an article presence status in the conveyor zone and the second signal 114 is indicative of an actuation status of the conveyor zone. In other words, the first signal 113 and the second signal 114 represent the operating states of the sensor 104 and the actuation device 106 as discussed previously. For example, the first signal 113 may be transmitted from the sensor 104 to the accumulation circuitry 110 via the input/output circuitry 108 in response to detecting the article at the conveyor zone. The second signal 114 may be transmitted from the accumulation circuitry 110 via the input/output circuitry 108 to the actuation device 106 in response to the first signal 113. According to an embodiment, the accumulation circuitry 110 comprises a processor 111 to process and perform computation on the first signal 113 and the second signal 114. In some examples, the first signal 113 may include one or more values, for example, an array of values expressed in terms of binary opcodes. These binary opcodes are indicative of number of times the sensor 104 toggled between the blocked operating state and the unblocked operating state. The input/output circuitry 108 may receive this array of values expressed in the form of binary opcodes and transmit the binary opcodes to the accumulation circuitry 110 which in turn performs computation on these binary opcodes to determine a total number of articles detected by the sensor 104. For example, a high '1' binary opcode may indicate the presence of the article at the conveyor zone detected by the sensor 104 and a low '0' binary opcode may indicate the presence of a gap and/or air which in turn indicates no presence of any article at the conveyor zone. In this regard, the accumulation circuitry 110 performs the computation by tracking the number of times the sensor 104 toggled from high '1' to low '0' which will in turn indicate the number of articles detected by the sensor 104. For example, consecutive high '1' before an occurrence of low '0' may indicate a presence of an article and a count of occurrence of consecutive high '1' may indicate a length of the article. According to an embodiment, the accumulation circuitry 110 transmits the second signal 114 to the actuation device 106 via the input/output circuitry 108 in response to computing the number of articles detected by the sensor 104. The second signal 114 is the actuation signal to actuate the actuation device 106 to toggle the accumulation conveyor between the accumulating state and the non-accumulating state. For example, the accumulation circuitry 110 tracks the number of articles detected by the sensor 104 and compares it to a predefined threshold limit to determine whether the second signal 114 can be transmitted to actuate the actuation device 106. When the number of articles is equal to or exceeds a threshold limit, the accumulation circuitry 110 may transmit the second signal 114 such that the actuation device 106 may toggle from the non-actuated position to the actuation position to drive the rollers of the conveyor zone to release the articles accumulated on the conveyor zone either to a downstream neighboring zone or to a merger conveyor. Accordingly, the conveyor zone of the accumulation conveyor is transitioned to a non-accumulating state releasing the articles downstream. In some examples, a time duration the sensor 104 is in the blocked state is tracked by the accumulation circuitry 110 to make decision on transmitting the second signal 114 to the actuation device 106. As discussed previously, a high '1' binary opcode which indicates the presence of the article is tracked in the array of binary opcodes. For example, if the array of binary opcodes indicates a constant high '1' without low '0', then it indicates that the sensor 104 is continuously blocked by the articles. The accumulation circuitry 110, by monitoring the number of occurrences of high '1' and time duration of the occurrences, may decide to transmit the second signal 114 to the actuation device 106 to release the articles on the conveyor zone to pave way for accumulating articles from a neighboring upstream zone. In some examples, the decision of the accumulation circuitry 110 may be based on comparing the time duration of the occurrences with a threshold time or based on comparing the number of occurrences of high '1' with a threshold number. Similarly, the accumulation circuitry 110 may transmit the second signal 114 to the actuation device 106 after the release of the articles on the neighboring downstream conveyor zone. For example, the accumulation circuitry 110 reads the updated array of binary opcodes after the release and identifies a constant low '0' followed by high '1', which then indicates that the sensor 104 is in the unblocked state without detecting any articles. In this regard, the time duration of the number of occurrences of low '0' can be compared with a threshold time or the number of occurrences of low '0' can be compared with a threshold number to initiate the transmission of the second signal 114 to the actuation device 106 to stop the actuation of the conveyor zone such that the actuation device 106 may be toggled to the non-actuated position disengaging it from the roller of the conveyor zone such that the accumulation conveyor is transitioned to the accumulation state. Accordingly, the conveyor zone of the accumulation conveyor may be in the accumulating state ready to receive the articles from neighboring upstream conveyor zone. Therefore, the first signal 113 is monitored/tracked by the accumulation circuitry 110 to decide whether to transmit the second signal 114 either for operating the accumulation conveyor in the accumulating state or for operating the accumulation conveyor in the non-accumulating state. According to an embodiment, monitoring of the first signal 113 and corresponding computation/comparison may also be performed by the input/output circuitry 108, and the accumulation circuitry 110 may decide to output the second signal 114 by receiving inputs from the input/output circuitry 108. Such first signal 113 and second signal 114 which represents the operating state of the sensor 104 and the actuation device 106 are recorded in the memory 112 and tracked/monitored/processed by the accumulation circuitry 110.

According to an embodiment, the first controller 101 operates at multiple periodic scan cycles of operation, with each scan cycle occurring for a specified time interval. In some examples, the specified time interval may be a constant time interval, for instance, 50 ms for all scan cycles. In some examples, the specified time interval may be varied, for instance, 50 ms for the first scam cycle and then 75 ms for the next scan cycle and so on. The scan cycle may define a specified time interval at which the first controller 101 is capable of performing computations allotted to it in an active state. After performing the computations, the first controller 101 enters a sleep state until awaked at the next specified time interval. For example, the controller may be in the active state for a first scan cycle and then enters the sleep state and toggles back to be in the active state for a second scan cycle and then re-enters the sleep state. In this regard, the first controller 101 may operate at multiple periodic scan cycle performing computations allotted to it in each scan cycle. According to an embodiment, the accumulation circuitry 110 receives the first signal 113 and transmits the second signal 114 during each periodic scan cycle. As previously discussed, a computation of the number of articles detected by the sensor 104 or length of the articles by monitoring the count of occurrences of high '1' or low '0' is performed during each periodic scan cycle. Accordingly, the second signal 114 to actuate the actuation device 106 either to the actuated position or the non-actuated position may be transmitted during each periodic scan cycle. The configurations of the first controller 101 as explained and illustrated herein, should not be taken in their restrictive sense, i.e. should not be taken as to limit the scope of the present invention. It is to be understood, as also apparent to a person skilled in the conveyor art to choose either the first controller 101 with periodic scan cycles or the first controller 101 without periodic scan cycles depending on power, cost savings and criticality of the process involving the first controller 101. Further, first controller 101 with any suitable configuration, that is intended to perform the activities previously discussed and yet to be discussed, may be employed without departing from the scope of the invention.

According to an embodiment, the first controller 101 records the first signal 113 and the second signal 114 in the memory 112. In some examples, the first signal 113 and the second signal 114 are recorded in the memory 112 in each periodic scan cycle. The first signal 113 and the second signal 114 may be stored in the memory 112 in the form of lookup tables. In some examples, each conveyor zone may have a corresponding lookup table for storing the first signal 113 and the second signal 114. The first controller 101 may perform computation and monitor the lookup tables in a sequence, such as, starting from the downstream most conveyor zone laddering up to the upstream most conveyor zone. In some examples, the first controller 101 may monitor only the lookup tables which are updated for each scan cycle. According to an embodiment, the lookup tables store a historical log of the first signal 113 and the second signal 114 of each conveyor zone of the accumulation conveyor. Each lookup table is updated for every scan cycle. The first controller 101 may perform computations and monitor the historical log of the first signal 113 and the second signal 114 to derive one or more accumulation parameters as shown in the parameter table below. In some examples, the look up tables maintain an article tracking array for recording the first signal 113 which indicates the presence status of the articles on each conveyor zone. The article tracking array includes number of articles sensed by the sensor 104. The input/output circuitry 108 may receive the array of binary opcodes and store these binary opcodes in the memory 112 which is then accessed by the accumulation circuitry 110. The accumulation circuitry 110 performs computation and process the array of binary codes and makes an entry of the number of articles in the article tracking array as shown in the below table. In some examples, the input/output circuitry 108 may transmit the binary opcodes to the accumulation circuitry 110 which in turn stores the array of binary opcodes in the memory 112. Accordingly, when either the input/output circuitry 108 or the accumulation circuitry 110 stores the array of binary opcodes in the memory 112, the accumulation circuitry 110 may monitor the stored binary opcodes to track occurrences of high '1' binary opcode on every scan cycle. For example, if the array of binary opcodes is 1111000111111, then the accumulation circuitry 110 will count only the occurrences of consecutive high '1' binary opcode and store it in the article tracking array in the memory 112. The high '1' binary opcode may indicate the presence of the article at the conveyor zone detected by the sensor 104. In the above example, first consecutive high '1' indicates article presence in the conveyor zone and detected by the sensor 104, and the following consecutive low '0' indicates that there is no presence of any article. The accumulation circuitry 110 may keep a track of the count of the occurrences of high '1' binary opcode in the string of stored binary opcodes and record the count in the article tracking array. An example of the article tracking array storing the total number of articles detected in two scan cycle is shown below.

TABLE 1.1

| Scan cycle count | Article tracking Array | Actuation tracking Array |
|---|---|---|
| 1 | {4, 6, 7, 3, 4, 2, 4} | {OFF} |
| 2 | {4, 6, 7, 3, 4, 2, 4, 5} | {ON, OFF} |

As shown in the above table, the accumulation circuitry 110 tracks a first count of the occurrences of high '1' binary opcode in the array of binary opcodes. The first count of the occurrences of high '1' binary opcode in the above example is 4. The value 4 is recorded in the article tracking array which is indicative of a first article in the first scan cycle detected by the sensor 104. Further, the accumulation circuitry 110 tracks a second count of the occurrences of high '1' binary opcode in the array of binary opcodes. The second count of the occurrences of high '1' binary opcode in the above example is 6. The value 6 is recorded in the article tracking array which is indicative of a second article in the first scan cycle detected by the sensor 104. In this regard, in the first scan cycle, the sensor 104 has detected 7 articles which has entries in the article tracking array along with the count of the occurrences of high '1'. According to an embodiment, the count of the occurrences of high '1' may be equated to a length of the article. For example, the first count of occurrences of high '1' is 4 which in turn represents that the article is of 4 inch/feet long. Therefore, the article tracking array stored in the memory 112 maintains a historical log of the number of articles detected along with the length of articles in every scan cycle. According to an embodiment, the accumulation circuitry 110 may also track the low '0' binary opcode which may indicate the presence of a gap and/or air which in turn indicates no presence of any article or gaps between articles. In this regard, a gap tracking array (not shown) may be created similar to the article tracking array to record the length of gaps between the articles in each scan cycle.

In addition to the article tracking array, an actuation tracking array is stored in the memory 112 to record the actuation status by recording the second signal 114 as previously discussed. The second signal 114 is the actuation signal to actuate the actuation device 106 to toggle the accumulation conveyor between the accumulating state and the non-accumulating state. In some examples, such second signal 114 may be issued by the accumulation circuitry 110 in response to tracking the number of articles and the length of articles in the article tracking array for a given scan cycle. In some examples, such second signal 114 may be recorded based on a current operating state of the actuation device 106 when tracking the number of articles. In the above example, the number of articles in the first scan cycle detected by the sensor 104 is 7 and the actuation signal is not transmitted to the actuation device 106 until the 7 articles are accumulated in the conveyor zone. The threshold number to initiate the transmission of the actuation signal to the actuation device 106 may be set to 7. In other words, the accumulation conveyor continues to operate in the accumulating state accumulating articles in the conveyor zone until the article count elapses 7 in the article tracking array. In the second scan cycle, the number of articles accumulated in the conveyor is 8 and the actuation signal is transmitted to the actuation device 106 when the 8$^{th}$ article approaches the conveyor zone and detected by the sensor 104 of that conveyor zone. Accordingly, the accumulation conveyor which continues to operate in the accumulating state toggles to a non-accumulating state to release the 7 articles downstream in such a manner to accommodate the 8$^{th}$ article detected during the scan cycle. In this regard, when the article count elapses 7 in the article tracking array, the actuation signal is transmitted to release the articles from the conveyor zone. The actuation signal 'OFF' indicates that the actuation device 106 is in the non-actuated position and the conveyor zone is accumulating and the actuation signal 'ON' indicates that the actuation device 106 is in the actuated position and the conveyor zone is non-accumulating. According to an embodiment, the actuation status of the conveyor zone is recorded in the actuation tracking array by tracking/monitoring the actuation signal or the second signal 114 in each scan cycle. In the above example, in the first scan cycle, the actuation status of the conveyor zone is OFF since there is no transmission of the actuation signal to the actuation device 106, however, in the next scan cycle, the actuation status of the conveyor zone toggles from OFF to ON and both the OFF, ON status are recorded as there is a transmission of the actuation signal to the actuation device 106. Therefore, 7 articles are detected with actuation status OFF in the first scan cycle and 8 article are detected with actuation status OFF, ON in the second scan cycle. In this regard, a historical log of the presence, number and length of articles and a historical log of the actuation status of the conveyor zone during each scan cycle is recorded and tracked using the article tracking array and the actuation tracking array stored in the memory 112. Such tracking arrays may be available for each conveyor zone of the accumulation conveyor. The accumulation circuitry 110 may perform computation on the historical data tracked using the tracking arrays to compute one or more accumulation parameters to determine if the release of articles from the accumulation conveyor is to be initiated. The above example is an illustration of the concept of tracking and maintaining a historical log of the article presence status and the actuation status and such illustration should not be taken in their restrictive sense, i.e. should not be taken as to limit the scope of the present invention. It is to be understood, as also apparent to a person skilled in the conveyor art that the historical log of the article presence status and the actuation status can be tracked and maintained in the memory 112 in any appropriate form without considering the scan cycles or tracking arrays in a single look-up table dedicated for one or more accumulation conveyors. According to an embodiment, the one or more accumulation parameters may be communicated to the second controller 102 via the communication circuitry 115, 116. The second controller 102 include a release circuitry 118 which may then decide the timing of the release of articles from the accumulation conveyor to the downstream conveyor or merger conveyor. The release circuitry 118 may be communicably coupled to a speed control device 120 which can also adjust a speed of the downstream conveyor or merger conveyor based on the one or more accumulation parameters such that the articles are released without jamming.

As previously discussed, the article presence status and the actuation status can be tracked and maintained in the memory for each conveyor zone of the accumulation conveyor, such conveyor zones are shown in FIG. 2. Referring to FIG. 2, there is shown a diagrammatic plan view of an accumulation conveyor 200 embodying one or more teachings of the present disclosure. Accumulation conveyor includes a plurality of individually controllable conveyor zones 202a, 202b, 204a, 204b, 206a, 206b, 208a, 208b, and 210a. Although in the embodiment depicted in FIG. 2 there are nine zones, the present invention is not limited to nine zones, or an odd or even number of zones. In the embodiment depicted, zones 202a, 202b, 204a, 204b, 206a, 206b, 208a, 208b, and 210a are generally three feet long, although they may be of any suitable length, such as six feet. In the embodiment depicted in FIG. 2, zone control modules 202c, 204c, 206c, 208c and 210c each control two zones, although a zone control module may control more than two zones or control only one zone, such as control module 210c which controls zone 210a, the discharge zone, which discharges to conveyor 200. The number of zones that a single zone control module may control is not limited by the present invention. Each zone 202a, 202b, 204a, 204b, 206a, 206b, 208a, 208b, and 210a is selectively driven in any suitable manner as is known in the art, such as for example, the drive arrangement shown in U.S. Pat. No. 6,889,822, the disclosure of which is incorporated herein by reference. In the embodiment depicted, each zone of accumulation conveyor 200 comprises a plurality of conveyor rollers (diagrammatically illustrated) defining a conveying surface, which may be selectively driven such as by an underlying chain or a drive belt (not shown) urged against the conveyor rollers using pneumatic actuators (not shown) which acts as the actuation device 106. Each control module 202c, 204c, 206c, 208c and 210c is configured to control the pneumatic actuators (not shown) of their associated zones, and is therefore connected to a pneumatic source. The control modules 202c, 204c, 206c, 208c and 210c may be pneumatically daisy-chained together. Each of these control modules 202c, 204c, 206c, 208c and 210c may be communicably coupled to the first controller 101. The first controller 101 may transmit the second signal 114 or the actuation signal to the respective control modules to actuate respective zones 202a, 202b, 204a, 204b, 206a, 206b, 208a, 208b, and 210a. Other drive arrangements include motorized drive rollers, with control modules configured appropriately therefore. Each zone 202a, 202b, 204a, 204b, 206a, 206b, 208a, 208b, and 210a includes respective sensors 202d, 202e, 204d, 204e, 206d, 206e, 208d, 208e and 210d that are connected to the respective control modules 202c, 204c, 206c, 208c and 210c of the zones 202a, 202b, 204a, 204b, 206a, 206b, 208a, 208b, and 210a. These sensors 202d, 202e, 204d, 204e, 206d, 206e, 208d, 208e, 210d output the first signal 113 to the respective control modules 202c, 204c, 206c, 208c and 210c of the zones 202a, 202b, 204a, 204b, 206a, 206b, 208a, 208b, and 210a which in turn communicates to the first controller 101. In some examples, the control modules 202c, 204c, 206c, 208c and 210c may temporarily store and/or collate the first signal 113 and may transmit the collated first signal when queried by the first controller 101. In some examples, the first controller 101 may query the zone control modules 202c, 204c, 206c, 208c and 210c when the first controller 101 toggles from the sleep state to the active state. In the embodiment depicted, the sensors 202d, 202e, 204d, 204e, 206d, 206e, 208d, 208e and 210d are photo eyes with respective reflectors, although any suitable sensor may be used, such as roller sensors or diffused scan sensors. The positions and orientations of the sensors 202d, 202e, 204d, 204e, 206d, 206e, 208d, 208e and 210d, also referred to herein as photo eyes, within the zones are selected based on the system parameters, such as length or type of packages.

In the embodiment depicted, control modules 202c, 204c, 206c, 208c and 210c are networked together with the first controller 101, communicating data to the first controller 101. The data indicative of conditions, for example, the presence status of articles in a conveyor zone or the actuation status of the conveyor zone of the plurality of zones 202a, 202b, 204a, 204b, 206a, 206b, 208a, 208b, and 210a. Although a daisy chain configuration is depicted, any suitable network may be used. Similarly, although first controller 101 is depicted as being a single physical device, a controller in an embodiment of the disclosed technology could be implemented in other ways as well, such as in the form of multiple integrated physical devices, or multiple discrete physical devices which communicate with each other and/or other devices via a network (e.g., a daisy chain network). The first Controller 101, which comprises at least one processor, comprises at least part of a processing system, which itself may have more than one controller, which executes processor-executable instructions to perform operations to control accumulation conveyor 200. In the embodiment depicted, logic for control of accumulation conveyor 200 is resident on first controller 101, which executes instructions that implement the control logic. Each zone 202a, 202b, 204a, 204b, 206a, 206b, 208a, 208b, and 210a has a respective settable operating speed that may be set by first controller 16. The first controller 101 may control more than one accumulation conveyor line as depicted in FIG. 3. Control modules 202c, 204c, 206c, 208c and 210c may be I/O based. In the embodiment depicted, an EtherCAT network is used to provide the high-speed communication necessary for controlling the zones. The present invention is not constrained to a certain I/O scheme, networking methodology, architecture or centralized processing. Alternatively, control modules could be devices with I/O and processing capability, such as a programmable logic control. In the embodiment depicted, the first controller 101 executes instructions to implement the control logic of an embodiment of the present invention. The interface, to which first controller 101 is coupled, may be as simple as discrete inputs and outputs for flow control devices (e.g., switches, sensors, solenoid valves, etc.) or as advanced as commands from one or more other components in the processing system of the first controller 101, or other processing systems entirely.

Referring to FIG. 3, there is shown a merge subsystem with accumulation conveyors and a merge conveyor. A plurality of upstream conveyors 302a, 302b, 302c, 302d, and 302e are illustrated as being disposed to release articles onto downstream conveyor or takeaway conveyor 304. Each upstream conveyor 302a, 302b, 302c, 302d, and 302e includes an accumulation conveyor 202 and a feed conveyor 306. Accumulation conveyors 202 may be disposed downstream of feed conveyors 306. Each accumulation conveyor 202 may include on or more conveyor zones 202a, 202b, 204a, 204b, 206a, 206b, 208a, 208b, and 210a as depicted in FIG. 2. Each of the upstream conveyor 302a, 302b, 302c, 302d, and 302e includes at least one upstream sensor 310, for example, photo eyes, encoders, limit switches. Similarly, the downstream conveyor 304 includes downstream sensors 312, for example, photo eyes and encoders. It is noted that although five upstream conveyors 302a, 302b, 302c, 302d, and 302e are illustrated, any suitable number of upstream conveyors may be utilized. According to an embodiment, it is noted that upstream conveyors 302a, 302b, 302c, 302d, and 302e may be disposed on either side of the downstream or takeaway conveyor 304, disposed in non-uniformly spaced locations, disposed at non-uniform orientations, and may be physically different from each other in length, size and number of individual conveyor sections. According to an embodiment, the upstream sensors 310 on each accumulation conveyor 202 may communicate the first signal 113 to the first controller 101. Each conveyor zone 202a, 202b, 204a, 204b, 206a, 206b, 208a, 208b, and 210a as shown in FIG. 2 on each of the accumulation conveyor 202 may have a corresponding lookup table in the memory. For example, a first upstream conveyor 302a with accumulation conveyor 202 may have two conveyor zones, each having a corresponding upstream sensor 310 to communicate the first signal 113 to the first controller 101. For example, the input/output circuitry 108 may receive the first signal 113 from each conveyor zone of the accumulation conveyor 202 and may record it in the corresponding lookup table in the memory dedicated for the first upstream conveyor 302a. Similarly, the second signal 114 may be transmitted from the input/output circuitry 108 to the zone control modules 202c, 204c, 206c, 208c and 210c as shown in FIG. 2, which is also indicated as 314 in FIG. 3 of the accumulation conveyor 202. In some examples, a consolidated article tracking array and a consolidated actuation status tracking array may be created for each upstream conveyor 302a, 302b, 302c, 302d, and 302e. The consolidated article tracking array may track the historical data of the number of articles and the actuation status of each conveyor zone of the upstream conveyor 302a, 302b, 302c, 302d, and 302e. Likewise, the historical data of the number of articles and the historical data of the actuation status of each conveyor zone of the five upstream conveyors 302a, 302b, 302c, 302d, and 302e are collated in the memory 112 of the first controller 101. In this regard, based on the consolidated actuation tracking array and consolidated article tracking array of each of the upstream conveyors 302a, 302b, 302c, 302d, and 302e, one or more accumulation parameters may be computed by the accumulation circuitry 110 for of each of the upstream conveyors 302a, 302b, 302c, 302d, and 302e. In some embodiments, the accumulation circuitry 110 can track the number of articles and the actuation status without any consolidated tracking array in the memory 112. An example of the one or more accumulation parameters determined based on the historical log of the first signal 113 (presence status high '1' and low '0') and the second signal 114 (actuation status 'ON' and 'OFF') is listed in the table below. As previously discussed and illustrated in Table 1.1, such historical log may be recorded using the tracking arrays stored in the memory 112. The presence status may be one of blocked state high '1' or unblocked state low '0' and the actuation status may be one of ON state—second signal issued for operating the conveyor zone in a non-accumulating state or OFF state—second signal issued for operating the conveyor zone in an accumulating state. The other inputs considered along with the presence status and the actuation status for calculating the one or more accumulation parameters are included to the table below. A detailed description of the computations performed by the first controller 101 to derive these accumulation parameters, using the input data comprising the historical log of the presence status and the actuation status, listed in the below table is explained in detail with examples below.

TABLE 1.2

Tracked Historical information in the memory

| Accumulation parameters | Photo eye status (blocked/unblocked status signal transmitted to the first controller during each scan cycle) | Actuation status (ON and OFF signal transmitted during each scan cycle) (ON - zone under non-accumulating state OFF - zone under accumulating state) | Other Data involved in the computation of the accumulation parameters |
|---|---|---|---|
| Total Length of Accumulation Conveyor Available | N/A | N/A | Configured length of each zone. |
| Total Length of Articles Ready to Release | Blocked | OFF | Configured length of each zone, location of zone |
| Total Length of Articles Accumulated | Blocked | OFF | Zone length |
| Total Length of Conveyor with Moving Articles | Blocked | ON | Zone length, timer |
| Percent Accumulated | Blocked | OFF | Zone length |
| Percent Full version1/First Full percentage | Blocked | Both | Zone length, timer |
| Estimated Infeed Rate | Blocked | Both | Zone length, timer, configured speed |
| Actual Infeed Rate Percentage | Blocked | ON | |
| Estimated Discharge Rate Percent | Both | ON | configured speed of accumulation conveyor and downstream conveyor |
| Estimated Compaction Quality of Release | Both | ON | Release signal, release rate slider |
| Length of an article fed onto Conveyor | Blocked | ON | Speed |
| Estimated Quantity of articles on Conveyor | Blocked | ON | |
| Total Length of articles currently on Conveyor | Blocked | ON | Speed |
| Total Length of articles currently moving | Blocked | Both | Speed |
| Percent Full version2/Second full percentage | Blocked | ON | Speed, length |
| Estimated Article Length Being Discharged | Blocked | ON | Speed, release signal |
| Article Gap Being Discharged | Unblocked | ON | Speed, release signal |
| Average Article Length | Blocked | ON | Speed, length, location of zone |

The above listed accumulation parameters are computed by the first controller 101 based on the historical log in the memory 112. For example, as illustrated in the table 1.2, the accumulation parameter–Total Length of Articles Ready to Release is calculated based on the blocked status signal history and the OFF-signal history along with the configured length of each zone and location of each zone. Further, the accumulation parameter–Estimated Infeed Rate is calculated based on the blocked status signal history and both the ON/OFF-signal history along with the zone length, timer, and configured speed of the zone. Likewise, all the accumulation parameters are computed based on the historical data (i.e., the presence status and actuation status) recorded overtime during each scan cycle. According to an embodiment, these accumulation parameters may be communicated to the second controller 102 with the release circuitry 118 which may then decide the timing of release of articles from the accumulation conveyor 202 to the downstream conveyor 304. The release circuitry 118 may be communicably coupled to a speed control device 120 which can also adjust a speed of the downstream conveyor 304 based on the accumulation parameters such that the articles are released without jamming. Further, the preset time interval for release of articles from the accumulation conveyor 202 may be reduced which in turn reduces the release of air after the release of articles from the accumulation conveyor 202 to the downstream conveyor 304. Below is a list of formulas programmed in the control logic and executed by the first controller 101 to calculate the one or more accumulation parameters listed in the above table.

The calculations executed by the first controller 101 to determine the one or more accumulation parameters are listed below:

Total Length of Articles Ready to Release=sum of accumulated articles in zone 1+sum of accumulated articles in zone 2+sum of accumulated articles in zone 3+ . . . +sum of accumulated articles in zone n. This is the sum of the configured length of each zone contiguous from the discharge that are fully accumulated (article present BLOCKED and zone actuation OFF) recalculated every scan, showing the amount of densely accumulated product that could be released at that moment in time before the first non-accumulated zone in the article stream.

Zone 1 being the discharge zone of the accumulation conveyor closer to the merge conveyor and Zone n being the upstream most zone or infeed zone of the accumulation conveyor. Alternatively, the sum of articles in each zone starting from the discharge zone to the upstream most zone is calculated based on the history of the blocked photoeye signal and the history of OFF actuation status signal recorded in the memory.

For example, as previously discussed, the high value '1' for each scan cycle along with the occurrence of OFF actuation signal is tracked to calculate the number of articles and a length of each article. As shown in Table 1.1, the number of articles and the actuation status signal is tracked using tracking arrays. As shown in Table 1.1, in scan cycle 1, 7 articles are tracked (i.e.) 7 articles are accumulated in the conveyor zone when the actuation status signal is OFF. The article tracking array has 7 entries representative of 7 articles and first entry in the array indicates count '4' which is number of occurrences high value '1' when the photoeye is blocked by the article. The count '4' may be proportional to a length of the article which blocked the photoeye. For example, count '4' may indicate that the length of the article is about 4 feet or 4 inches. Likewise, the second entry in the article tracking array indicates a length of the next article accumulated in the conveyor zone. In this regard, a cumulative sum of length of articles in each conveyor zone starting from the discharge zone to the upstream most zone is computed by the first controller to arrive at the Total Length of Articles Ready to Release.

Total Length of Articles Accumulated=sum of articles in zone 1+sum of articles in zone 3+sum of articles in zone 6+sum of articles in zone 9, wherein Zone 1, 3, 6, 9—are non-consecutive zones which are currently in the accumulating state.

The sum of articles in each accumulating zone is calculated based on the current and/or history of the blocked photoeye signal and the current and/or history of OFF actuation status signal recorded in the memory for that accumulating zone.

As discussed previously, the Total length of articles accumulated is also calculated in the same manner as that of the Total Length of Articles Ready to Release, however, the Total length of articles accumulated is calculated for all the conveyor zones which are in the accumulating state (i.e.) the conveyor zone for which actuation status signal is OFF and article presence sensor is BLOCKED.

Total Length of Conveyor with Moving Articles=sum of articles in zone 1+sum of articles in zone 2+sum of articles in zone 4+sum of articles in zone 7 . . . +sum of articles in zone n, wherein Zone 1, 2, 4, 7 . . . n—are zones which are currently in the non-accumulating state.

The sum of articles in each non-accumulating zone is calculated based on the history of the blocked photoeye signal and the history of ON actuation status signal recorded in the memory for that accumulating zone.

As discussed previously, the Total Length of Conveyor with Moving Articles is also calculated in the same manner as that of the Total length of Articles Accumulated, however, the Total length of Conveyor with Moving Articles is calculated only for the conveyor zones which are in the non-accumulating state (i.e.) the conveyor zone for which actuation status signal is ON.

Further, when calculating the Total length of Conveyor with Moving Articles, the first controller tracks the blocked photoeye signal only for 'zone length time', wherein the zone length time is calculated using the formula:

$$\text{Zone length time} = \frac{\text{Configured length of each conveyor zone}}{\text{Accumulation conveyor configured speed}},$$

wherein Configured length and Configured speed may be a predefined default length and speed of the accumulation conveyor.

For example, for an accumulation conveyor operating at a predefined default speed of 200 fpm (or 40 inches per second (ips)) and a predefined default length of 36 inches, the zone-length of time would be 36 in/40 ips=0.9 secs. In this regard, during the duration of 0.9 secs, the first controller tracks the blocked status signal when the actuation status signal is 'ON' for that conveyor zone to arrive at the Total Length of Conveyor with Moving Article.

$$\text{Percent Accumulated} = \frac{\text{Total length of articles accumulated}}{\text{Total length of accumulation conveyor available}},$$

wherein Total length of accumulation conveyor available is a cumulative sum of configured length of each conveyor zone of the accumulation conveyor.

$$\text{First Full percentage/Percent Full } Version1 = \frac{\begin{array}{c}(\text{Total length of articles accumulated} + \\ (\text{Total length of Conveyor with Moving Articles} * \\ \text{Fill Coefficient}))\end{array}}{(\text{Total length of accumulation conveyor available})},$$

wherein the Fill Coefficient is a fixed value≤1.0, but >0

The Fill Coefficient represents the average article length to total conveyor zone length ratio of each moving conveyor zone, knowing that most zones would have a mixture of air/gap and article, and depends on article length and gap/air between each article. During testing, for instance, fill coefficient=0.6 was used to show that moving article consumed an average of 60% of each moving conveyor zone.

$$\text{Estimated Infeed Rate} = \frac{\begin{array}{c}((\text{Percent Full } Version1 \text{ at time } T2 - \\ \text{Percent Full } Version1 \text{ at time } T1) * \\ \text{Total length of accumulation conveyor available})\end{array}}{(\text{time } T2 - \text{time } T1)}$$

Assuming T1=0 sec and T2=30 secs,
Percent Full Version1 at time T1=50%,
Percent Full Version1 at time T2=65%,
Total length of accumulation conveyor available=300 ft, then Estimated Infeed Rate=(((0.65−0.50)*300 ft)*(12 in/1 ft))/30 sec=18 cips*5=90 cfpm (carton feet per minute), wherein 12 in/1 ft is for conversion to carton inches per second (cips).

$$\text{Actual Infeed Rate Percentage} = \frac{\left(\begin{array}{c}\text{Number of Scan counts at which the} \\ \text{infeed zone recorded a blocked photoeye signal}\end{array}\right)}{(\text{Total number of scan counts})} * 100$$

Actual Infeed Rate Percentage is based on the historical log of the blocked photoeye signal of the upstream most or infeed conveyor zone when the actuation status signal is 'ON' for the infeed conveyor zone and the neighboring downstream conveyor zone.

For example, if the scan cycle counts=200 where each scan takes the exact same amount of time, the first controller tracks only the history of occurrences of high value '1' received from the upstream most conveyor zone or infeed zone during the 200 scan cycles while both that zone and the downstream zone stay on. Assuming 86 out of 200 scan cycle counts were identified to have recorded occurrences of high value '1', then the Actual infeed rate percentage is (86/200)*100 which is 43%.

Estimated Discharge Rate Percentage =

$$\frac{\begin{pmatrix}\text{Recorded number of the discharge zone's} \\ \text{scan counts with a blocked photoeye signal}\end{pmatrix}}{\text{(Total number of scan counts during the sample)}} * 100$$

Estimated Discharge Rate Percentage is based on the historical log of the blocked photoeye signal of each conveyor zone when the actuation status signal is 'ON' for all the conveyor zones ready to discharge.

Estimated Compaction Quality of Release =

$$\frac{\text{Estimated Discharge Rate Percentage}}{\text{Smart Accumulation Release Rate Slider Value}} * 100$$

Estimated Compaction Quality of Release is a percentage to see how well the zones are tightly packing during accumulation by monitoring how close the actual release rate matches the intended rate. The smart accumulation release slider value is calculated using the logic disclosed in U.S. Pub. No. 20200247616 A1, which is fully incorporated herein for reference.

Length of an Article Fed onto Conveyor is similar to the calculation of the Total length of articles ready to release, however, the Length of an article Fed onto Conveyor is based on the length of articles traveling past the photoeye of only the upstream most conveyor zone or infeed zone when the actuation status signal of the infeed zone is ON and the actuation status signal of the infeed and downstream conveyor zones of the accumulation conveyor is ON. As previously discussed, the length of articles may be equated to the number of consecutive occurrences of high '1' when the infeed zone photoeye is blocked.

Estimated Quantity of Articles on Conveyor is similar to the Length of an Article Fed onto Conveyor, however, instead of summing up the length of the articles traveling past the infeed zone, the number of occurrences of blocked status signal received from the photoeye of the upstream most conveyor zone or infeed zone is tracked using the article tracking array as shown in Table 1.1 to compute number of entries in the article tracking array stored in the memory for the upstream most conveyor zone or infeed zone. The number of entries is proportional to the number of occurrences of a continuous blocked status signal received from the photoeye of the upstream most conveyor zone or infeed zone which in turn is indicative of the estimated quantity of articles. The quantity of articles is computed when the actuation status signal of the infeed zone is ON and the actuation status signal of the other conveyor zones of the accumulation conveyor is one of OFF or ON. Each entry in the article tracking array needs to be removed in a first in, first out fashion as a mass length of articles leave the discharge end of the conveyor.

Total Length of Articles Currently on Conveyor is similar to the Estimated Quantity of Articles on Conveyor, however, instead of counting the entries in the article tracking array, a value of each entry is summed up to determine a total summation value indicative of the total length of articles on the conveyor. The values in the article tracking array of all conveyor zones are summed up to determine the total length of articles currently on the conveyor. The summed-up value is decremented as the articles are from each conveyor zone. In other words, the total length of articles currently on conveyor is the summed-up value of historical log of Length of an article Fed onto conveyor.

Total length of articles currently Moving=Total Length of Articles Currently on Conveyor−Total Length of Articles Accumulated Second Full percentage/Percent Full $version2$ =

$$\frac{\text{Total Length of Articles Currently on Conveyor}}{\text{Total Length of Accumulation Conveyor Available}}$$

Total length of accumulation conveyor available is a cumulative sum of configured length of each conveyor zone of the accumulation conveyor.

Estimated Article Length Being Discharged is similar to the calculation of the length of articles fed on to the conveyor, however, rather than tracking the length of articles traveling past the photoeye of only the infeed zone, the length of articles traveling past the photoeye of the discharge zone is tracked when the actuation status signal of the discharge zone is ON and the actuation status signal of the other conveyor zones of the accumulation conveyor is one of OFF or ON. As previously discussed, the length of articles may be equated to the number of consecutive occurrences of high '1' when the discharge zone photoeye is blocked multiplied by the speed of the conveyor.

Article Gap Being Discharged=Total number of occurrences of unblocked status signal*Deterministic time between each scan count*Accumulation conveyor configured speed The article gap being discharged is computed based on tracking the historical log of the number of occurrences of unblocked status signal while the actuation status signal of the discharge zone is ON. For example, the number of occurrences of low '0' in between the high '1' is tracked to identify the gap between the articles while being discharged.

Average Article Length =

$$\frac{\text{Cumulative length of articles in the article tracking array}}{\text{Cumulative number of articles in the article tracking array}}$$

The cumulative number of articles in the article tracking array as shown in Table 1.1 for one scan cycle count for one conveyor zone is 7 and the cumulative length of the 7 articles is 4+6+7+3+4+2+4=30.

The above described formulas and calculations may be fed into the first controller 101 as a part of the control logic for accumulation conveyor management. The calculations may be performed for each upstream conveyor as shown in FIG. 3. The accumulation parameters computed by the first controller 101 is transmitted to the second controller 102 which can make article release decisions for each of the upstream conveyor based on the accumulation parameters. The above described examples may be for illustrative purposes to describe the computations of the first controller 101 to determine the accumulation parameters and should not be construed to narrow the scope of the disclosure.

In some examples, the accumulation parameters are transmitted through a field bus to the second controller. In such examples, the first controller can transmit the accumulation parameter in the form of opcodes. For examples, the first controller creates a two byte word, broken into a 4 bit opcode, and the other 12 bits would be the value of the accumulation parameter to be transmitted through the field bus. When transmitting the accumulation parameter a first configurable setting is provided by the first controller to prioritize each opcode by placing it into a level, 0 to 4. Each level up from 0 repeated itself half as much as the level below it. A second configurable setting is to provide the number of times each opcode and associated data will be repeated before moving onto the next opcode as network reading offsets are different than the scan cycle time and so it may be required to repeatedly transmit the bits a few times to ensure proper receipt. As an example, if Opcode 0 was priority 0, Opcode 1 and 2 were priority 1, Opcode 3 and 4 were priority 2, and the repeat variable is set to 2, the order of the Opcodes look like: 0, 0, 1, 1, 0, 0, 2, 2, 0, 0, 3, 3, 0, 0, 1, 1, 0, 0, 2, 2, 0, 0, 4, 4 . . . and then repeat. The consecutive opcodes 1, 1; 2, 2; 3, 3 and so on indicates a value of the accumulation parameter.

Figure 4:
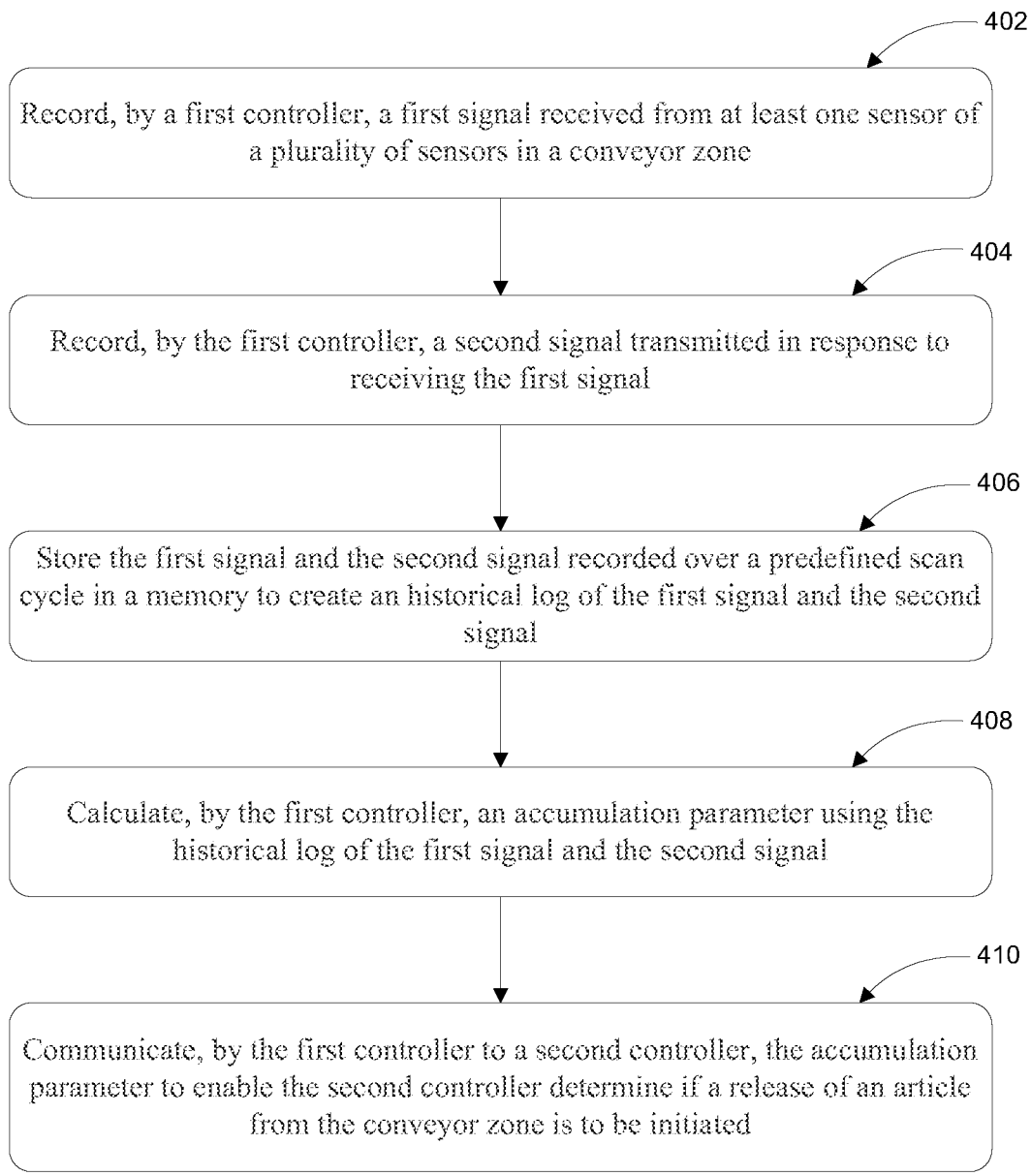
FIG. 4 illustrates an exemplary flow diagram illustrating a method for article release management in accordance with an embodiment of the present invention.

FIG. 4 illustrates an exemplary flow diagram illustrating a method for article release management in accordance with an embodiment of the present invention. The first controller is communicably coupled to the sensors and the actuation device on each of the conveyor zones of the accumulation conveyor to receive signals from the sensors and control the actuation device in response to these signals. At step 402, the first controller, records a first signal received from at least one sensor of a plurality of sensors in a conveyor zone of the accumulation conveyor. The first controller may receive the first signal either periodically at specified time intervals or continuously based on volume of articles handled by the accumulation conveyor. According to an embodiment, the first controller may have active states and intermittent sleep states with the first controller receiving the first signal at the active states. In other words, the first controller operates at multiple periodic scan cycles of operation, with each scan cycle occurring for a specified time interval and the first signal received at each scan cycle. The scan cycle defines the active state of the first controller. Similarly, at step, 404, the second signal is transmitted by the first controller in response to the first signal. The first signal may be received from multiple sensors during one scan cycle of operation of the first controller. When the first signal is received, the first controller may decide whether to release or transmit the second signal based on an information associated with the first signal. According to an embodiment, the first signal is indicative of an article presence status in the conveyor zone and the second signal is indicative of an actuation status of the conveyor zone. For example, if the first signal indicates that the article presence status is TRUE in the conveyor zone, then second signal may be issued to actuate the actuation device such that the actuation status in ON and conveyor zone remains in a running state or active state. The vice-versa may occur if the first signal indicates that the article presence status is FALSE. In some examples, the first signal indicates article presence status as explained in conjunction with FIG. 1 in the form of binary opcodes. These binary opcodes are indicative of number of times the sensor toggled between the blocked state and the unblocked state. Such information may be available to the first controller to make decisions whether to actuate the actuation device to either an actuated or an un-actuated state (i.e.) to either set the actuation status to ON or OFF. In this regard, the first signal received in the form of binary opcodes may be indicative of the number of articles and the length of articles arriving or accumulating in each conveyor zone. Such information from the first signal may be recorded over a periodic scan cycle in the memory at step 406. Further, the second signal transmitted in response to the information from the second signal (i.e., actuation status being ON or OFF) may also be recorded over the periodic scan cycle in the memory at step 406. Further, the information from the first signal and the signal is stored in the memory to create a historical log of the first signal and the second signal. In some examples, the historical log may be stored in the form of look up tables and updated during the periodic scan cycle. In some examples, the historical log may be stored in tracking arrays as shown in Table 1.1 comprising number of articles, length of articles and corresponding actuation status. The historical log is created for each conveyor zone starting from the discharge zone to the uppermost conveyor zone or infeed zone. At step 408, the first controller calculates one or more accumulation parameters using the information stored in the memory in the form of the historical log. Such accumulation parameters are listed in Table 1.2 and the formulas to compute the accumulation parameters are described above in detail. At step 410, the first controller communicated the computed accumulation parameters to the second controller to enable the second controller determine if a release of an article from the conveyor zone is to be initiated. In some examples, as shown in FIG. 3, when multiple accumulation conveyors are employed, the second controller may decide to sequence or prioritize the release of the articles for the accumulation conveyors based on the accumulation parameters. Since the history of both the actuation status and the article presence status are used as inputs to calculate the accumulation parameters, the second controller may efficiently merger articles by sequentially programming the release or prioritizing the release of articles without any false trigger, delay or collision and jamming of the articles.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the embodiment, specific terminology was used for the sake of clarity. It is to be understood that each specific term includes all technical equivalents which operate in a similar manner to accomplish a similar purpose.

The invention claimed is:

1. A method comprising:
   recording, by a first controller, a first signal received from at least one sensor of a plurality of sensors in a conveyor zone;
   recording, by the first controller, a second signal transmitted in response to receiving the first signal;
   storing the first signal and the second signal recorded over a periodic scan cycle in a memory to create a historical log of the first signal and the second signal, wherein the first signal is indicative of an article presence status in the conveyor zone and the second signal is indicative of an actuation status of the conveyor zone;
   calculating, by the first controller, an accumulation parameter using the historical log of the first signal and the second signal; and
   communicating, by the first controller to a second controller, the accumulation parameter to enable the second controller determine if a release of an article from the conveyor is to be initiated.

2. The method of claim 1, wherein creating the historical log further comprises:
   updating the first signal and the second signal over the periodic scan cycle; and
   storing the first signal and the second signal in look-up tables or tracking arrays assigned for each conveyor zone.

3. The method of claim 1, wherein calculating the accumulation parameter comprises:
   calculating a total length of articles ready to be released from conveyor zones of an upstream conveyor zone to a downstream conveyor, a total length of the articles accumulated in each conveyor zone on the upstream conveyor, a total length of conveyor with moving articles in each conveyor zone on the upstream conveyor and a length of an article fed onto the upstream conveyor.

4. The method of claim 1, wherein calculating the accumulation parameter further comprises:
   calculating an estimated article infeed rate, a percentage of article accumulated, a first full percentage of an upstream conveyor, a second full percentage of the upstream conveyor, a total length of the articles currently on the upstream conveyor, total length of articles currently moving and an average article length.

5. The method of claim 1, wherein calculating the accumulation parameter further comprises:
   calculating an estimated discharge rate percent, estimated compaction quality of release, estimated quantity of the articles on an upstream conveyor, estimated article length being discharged, and article gap being discharged.

6. The method of claim 1, wherein recording the first signal and the second signal comprises:
   recording the first signal received and the second signal transmitted from/to multiple conveyor zones on a upstream conveyor;
   storing the first signal received and the second signal transmitted in look-up tables or tracking arrays assigned for each conveyor zone; and
   updating the look-up tables over the periodic scan cycle to create the historical log for each conveyor zone on the upstream conveyor.

7. The method of claim 1, wherein recording the first signal and the second signal comprises:
   receiving the first signal at the first controller from the at least one sensor in the conveyor zone;
   determining if the second signal is to be transmitted from the first controller to a zone control module to toggle an upstream conveyor between one of an accumulated state and a non-accumulated state.

8. The method of claim 1, wherein the periodic scan cycle defines a first specified time interval at which the first controller is an active state, and wherein a cumulative value of the first signal and the second signal is recorded during the periodic scan cycle creating the historical log of the first signal and the second signal.

9. The method of claim 1, wherein the article presence status is indicative of presence of one or more articles which is based on blocked/unblocked status of the at least one sensor in each conveyor zone during the periodic scan cycle.

10. The method of claim 1, wherein the actuation status is indicative of the ON/OFF status of conveyor zone during the periodic scan cycle.

11. The method of claim 1, wherein the ON/OFF status is indicative of whether the conveyor zone is in one of the accumulated state or the non-accumulated state.

12. A controller, comprising:
    a processor; and
    a memory,
    wherein the processor is coupled to the memory and is configured to:
      record a first signal received from at least one sensor of a plurality of sensors in a conveyor zone;
      record a second signal transmitted in response to the first signal;
      store the first signal and the second signal over a periodic scan cycle in the memory to create a historical log of the first signal and the second signal, wherein the first signal is indicative of article presence status in the conveyor zone and the second signal is indicative of an actuation status of the conveyor zone;
      calculate an accumulation parameter using the historical log of the first signal and the second signal; and
      communicate the accumulation parameter to enable a second controller determine if a release of an article from the conveyor zone is to be initiated.

13. The controller of claim 12, wherein the at least one sensor is one of a photo-eye sensor, an infrared sensor, a laser sensor, a proximity sensor, or an image sensor.

14. The controller of claim 12, wherein the processor is further configured to:
    calculate a total length of articles ready to be released from conveyor zones of an upstream conveyor zone to a downstream conveyor, a total length of the articles accumulated in each conveyor zone on the upstream conveyor, a total length of conveyor with moving articles in each conveyor zone on the upstream conveyor, and a length of an article fed onto the upstream conveyor.

15. The controller of claim 12, wherein the processor is further configured to:
calculate an estimated article infeed rate, a percentage of article accumulated, a first full percentage of an upstream conveyor, a second full percentage of the upstream conveyor, a total length of the articles currently on the upstream conveyor, total length of articles currently moving and an average article length.

16. The controller of claim 12, wherein the processor is further configured to:
calculate an estimated discharge rate percent, estimated compaction quality of release, estimated quantity of the articles on an upstream conveyor, estimated article length being discharged, and article gap being discharged.

17. A material handling system, comprising:
an upstream conveyor communicably coupled to a first controller;
a downstream conveyor communicably coupled to a second controller; and
the first controller and the second controller communicably coupled to each other and with at least one sensor installed on the upstream conveyor and the downstream conveyor, wherein the first controller is configured to:
record a first signal received from the at least one sensor of the upstream conveyor;
record a second signal transmitted in response to the first signal;
store the first signal and the second signal over a multiple scan cycles in the memory to create a historical log of the first signal and the second signal, wherein the first signal is indicative of article presence status in the upstream conveyor and the second signal is indicative of an actuation status of the upstream conveyor;
calculate an accumulation parameter using the historical log of the first signal and the second signal; and
communicate the accumulation parameter to enable the second controller determine if a release of an article from the upstream conveyor is to be initiated.

18. The material handling system of claim 17, wherein the first controller is further configured to:
calculate a total length of articles ready to be released from conveyor zones of the upstream conveyor zone to the downstream conveyor, a total length of the articles accumulated in each conveyor zone on the upstream conveyor, a total length of conveyor with moving articles in each conveyor zone on the upstream conveyor, and a length of an article fed onto the upstream conveyor.

19. The controller of claim 17, wherein the first controller is further configured to:
calculate an estimated article infeed rate, a percentage of article accumulated, a first full percentage of the upstream conveyor, a second full percentage of the upstream conveyor, a total length of the articles currently on the upstream conveyor, total length of articles currently moving and an average article length.

20. The material handling system of claim 17, wherein the first controller is further configured to:
calculate an estimated discharge rate percent, estimated compaction quality of release, estimated quantity of the articles on the upstream conveyor, estimated article length being discharged, and article gap being discharged.

* * * * *